US012116186B2

(12) United States Patent
Pinkstone et al.

(10) Patent No.: US 12,116,186 B2
(45) Date of Patent: Oct. 15, 2024

(54) CARTON WITH DISPENSER

(71) Applicant: Graphic Packaging International, LLC, Atlanta, GA (US)

(72) Inventors: Felicia A. Pinkstone, Aston, PA (US); Matthew R. Kearns, Woodstock, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 293 days.

(21) Appl. No.: 17/540,302

(22) Filed: Dec. 2, 2021

(65) Prior Publication Data

US 2022/0177187 A1 Jun. 9, 2022

Related U.S. Application Data

(60) Provisional application No. 63/121,451, filed on Dec. 4, 2020.

(51) Int. Cl.
*B65D 5/72* (2006.01)
*B31B 50/26* (2017.01)
(Continued)

(52) U.S. Cl.
CPC .............. *B65D 5/727* (2013.01); *B31B 50/26* (2017.08); *B31B 50/84* (2017.08); *B65D 5/0227* (2013.01);
(Continued)

(58) Field of Classification Search
CPC ..... B31B 2110/35; B31B 50/26; B31B 50/84; B65D 5/727; B65D 5/0227; B65D 5/445
(Continued)

(56) References Cited

U.S. PATENT DOCUMENTS

| | | | |
|---|---|---|---|
| 2,470,388 | A | 5/1949 | Ball |
| 3,133,689 | A | 5/1964 | Rossi |

(Continued)

FOREIGN PATENT DOCUMENTS

| | | | |
|---|---|---|---|
| JP | 50-010631 U | | 2/1975 |
| WO | WO 2004/043790 | A2 | 5/2004 |
| WO | WO 2008/086272 | | 7/2008 |

OTHER PUBLICATIONS

International Search Report and Written Opinion for PCT/US2021/061524 dated Mar. 18, 2022.

*Primary Examiner* — J C Jacyna
(74) *Attorney, Agent, or Firm* — Womble Bond Dickinson (US) LLP

(57) ABSTRACT

A carton for holding and dispensing a flowable product includes a plurality of panels extending at least partially around an interior of the carton and including a front panel, a back panel, and at least one side panel, a plurality of end flaps foldably connected to respective panels of the plurality of panels for forming a closed end of the carton, and a dispenser for accessing the interior of the carton, the dispenser including a dispenser panel and a dispenser opening, the dispenser panel being movable between a closed position wherein the dispenser opening is closed and an open position wherein the dispenser opening is open to allow removal of the flowable product through the dispenser opening, the dispenser panel includes a cover portion and a protruding portion extending from the cover portion, in the closed position, the protruding portion is at least partially received in the dispenser opening.

41 Claims, 5 Drawing Sheets

(51) Int. Cl.

| | |
|---|---|
| ***B31B 50/84*** | (2017.01) |
| ***B65D 5/02*** | (2006.01) |
| ***B65D 5/44*** | (2006.01) |
| *B31B 110/35* | (2017.01) |
| *B31B 120/50* | (2017.01) |

(52) U.S. Cl.
CPC .......... *B65D 5/445* (2013.01); *B31B 2110/35* (2017.08); *B31B 2120/50* (2017.08)

(58) Field of Classification Search
USPC .......... 229/233, 234, 247, 124, 125, 125.17, 229/121, 215, 220–225, 122, 122.1, 123, 229/123.1, 123.2, 123.3, 248; 222/212
See application file for complete search history.

(56) References Cited

U.S. PATENT DOCUMENTS

| | | | | |
|---|---|---|---|---|
| 4,142,635 | A * | 3/1979 | Capo | B65D 5/703 229/233 |
| 4,949,899 | A * | 8/1990 | Stone | B65D 5/727 229/917 |
| 5,036,983 | A | 8/1991 | Thykeson | |
| 5,810,250 | A * | 9/1998 | Stone | B65D 5/705 493/69 |
| 5,875,961 | A * | 3/1999 | Stone | B65D 5/705 493/69 |
| 8,002,171 | B2 | 8/2011 | Ryan et al. | |
| 8,800,855 | B2 | 8/2014 | Fitzwater | |
| 9,108,761 | B2 | 8/2015 | Fitzwater et al. | |
| 9,156,582 | B2 | 10/2015 | Walsh et al. | |
| 9,346,582 | B2 | 5/2016 | Pinkstone | |
| 9,463,896 | B2 | 10/2016 | Fitzwater | |
| 9,701,438 | B2 | 7/2017 | Fitzwater et al. | |
| 10,124,947 | B2 | 11/2018 | Pinkstone et al. | |
| 10,479,549 | B2 | 11/2019 | Kearns | |
| 2004/0089671 | A1 * | 5/2004 | Miller | B65D 71/36 221/302 |
| 2012/0138667 | A1 | 6/2012 | Burke et al. | |

* cited by examiner

CARTON WITH DISPENSER

CROSS-REFERENCE TO RELATED APPLICATION

This application claims the benefit of U.S. Provisional Patent Application No. 63/121,451, filed on Dec. 4, 2020.

INCORPORATION BY REFERENCE

The disclosure of U.S. Provisional Patent Application No. 63/121,451, filed on Dec. 4, 2020 is hereby incorporated by reference for all purposes as if presented herein in its entirety.

BACKGROUND

The present disclosure generally relates to cartons for holding and dispensing products including flowable products.

SUMMARY

According to one aspect, the disclosure is generally directed to a carton for holding and dispensing a flowable product, the carton comprising a plurality of panels extending at least partially around an interior of the carton and including a front panel, a back panel, and at least one side panel, a plurality of end flaps foldably connected to respective panels of the plurality of panels for forming at least one closed end of the carton, and a dispenser for accessing the interior of the carton, the dispenser comprising a dispenser panel and a dispenser opening, the dispenser panel being movable between a closed position wherein the dispenser opening is closed and an open position wherein the dispenser opening is open to allow removal of the flowable product through the dispenser opening, the dispenser panel comprises a cover portion and a protruding portion extending from the cover portion, in the closed position, the protruding portion is at least partially received in the dispenser opening.

According to another aspect, the disclosure is generally directed to a blank for forming a carton for holding and dispensing a flowable product, the blank comprising: a plurality of panels for extending at least partially around an interior of the carton when the carton is formed from the blank, the plurality of panels comprising a front panel, a back panel, and at least one side panel, a plurality of end flaps foldably connected to respective panels of the plurality of panels for forming at least one closed end of the carton when the carton is formed from the blank, and dispenser features for forming a dispenser for accessing the interior of the carton formed from the blank, the dispenser features for forming a dispenser panel and a dispenser opening in the carton formed from the blank such that the dispenser panel is movable between a closed position wherein the dispenser opening is closed and an open position wherein the dispenser opening is open to allow removal of the flowable product through the dispenser opening when the carton is formed from the blank, the dispenser features are for forming the dispenser panel having a cover portion and a protruding portion extending from the cover portion, in the closed position, the protruding portion for being least partially received in the dispenser opening when the carton is formed from the blank.

According to another aspect, the disclosure is generally directed to a method of forming a carton for holding and dispensing a flowable product, the method comprising obtaining a blank comprising a plurality of panels including a front panel, a back panel, and at least one side panel, a plurality of end flaps foldably connected to respective panels of the plurality of panels, and dispenser features, folding the plurality of panels at least partially around an interior of the carton, folding the plurality of end flaps to form at least one closed end of the carton, arranging the dispenser features to form a dispenser comprising a dispenser panel and a dispenser opening, the dispenser panel comprising a cover portion and a protruding portion extending from the cover portion, and positioning the dispenser panel in a closed position in which the protruding portion is at least partially received in the dispenser opening.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

Cartons according to the present disclosure can accommodate articles of numerous different shapes. For the purpose of illustration and not for the purpose of limiting the scope of the disclosure, the following detailed description describes articles such as flowable products or materials, e.g., granular materials/materials with a relatively small particle size, such as flowable food products. In one embodiment, articles described herein can be flowable products such as, e.g., cereal, granola, trail mix, candy, pasta, or any other food product such as liquid or powdered food or beverage products. In other embodiments, the flowable products could be nonfood productions (e.g., detergent, cat litter, etc.) without departing from the disclosure.

In this specification, the terms "lower," "bottom," "upper," and "top" indicate orientations determined in relation to fully erected and upright cartons. As described herein, cartons can be formed from blanks by overlapping multiple panels, portions, and/or end flaps. Such panels, portions and/or end flaps may be designated herein in terms relative to one another, e.g., "first", "second", "third", etc., in sequential or non-sequential reference, without departing from the disclosure.

Figure 1:
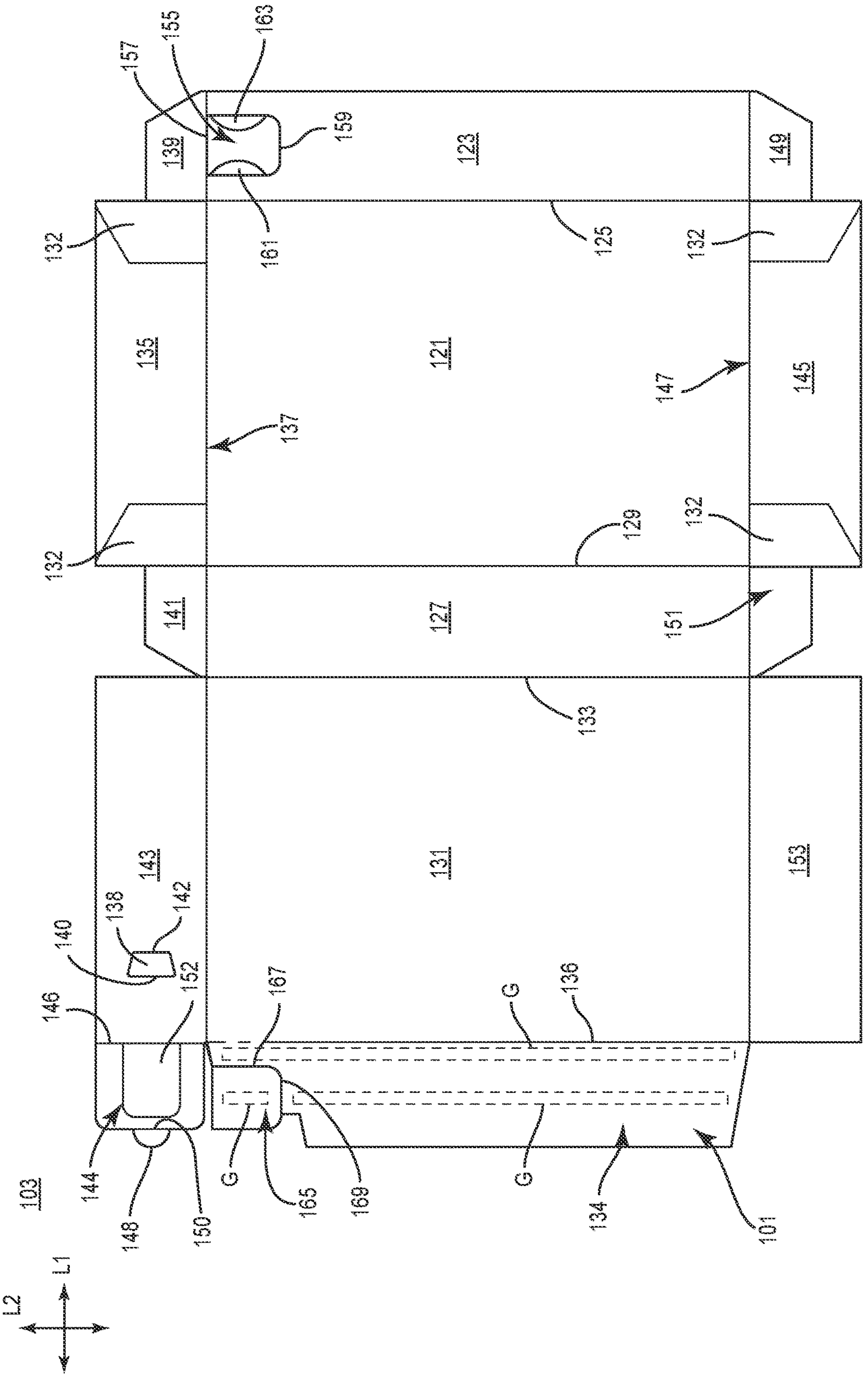
FIG. 1 is a plan view of an exterior surface of a blank used to form a carton according to an exemplary embodiment of the disclosure.

FIG. 1 is a plan view of an exterior surface 101 of a blank, generally indicated at 103, used to form a container or carton 105 (FIG. 2) according to an exemplary embodiment of the disclosure. As described further herein, the carton 105 can be provided with a dispenser 109 for holding and dispensing a flowable product(s) held in an interior 107 of the carton 105. The dispenser can be provided with a dispenser panel 111 that is repositionable for selectively opening and closing the dispenser 109, for example, to transition between an open configuration and a closed configuration and/or to maintain one or more conditions of the product(s) in the carton 105.

As shown in FIG. 1, the blank 103 can have a longitudinal axis L1 and a lateral axis L2, and a plurality of panels for extending at least partially around the interior 107 of the carton 105 formed from the blank 103. In the illustrated embodiment, the plurality of panels of the carton blank 103 can include a front side panel or front panel 121, a first side panel 123 foldably connected to the front panel 121 at a lateral fold line 125, a second side panel 127 foldably connected to the front panel 121 at a lateral fold line 129, and a back side panel or back panel 131 foldably connected to the second side panel 127 at a lateral fold line 133. An attachment flap or attachment panel 134 can be foldably connected to the back panel 131 at a lateral fold line 136.

The blank 103 can also include a plurality of end flaps for forming at least one closed end of the carton 105. The end flaps can include a front top end flap 135 foldably connected to the front panel 121 at a respective portion of a longitudinal fold line 137, a first side top end flap 139 foldably connected to the first side panel 123 at a respective portion of the longitudinal fold line 137, a second side top end flap 141 foldably connected to the second side panel 127 at a respective portion of the longitudinal fold line 137, and a back top end flap 143 foldably connected to the back panel 131 at a respective portion of the longitudinal fold line 137. The top end flap 143 can include a retention flap 138 for forming a retention opening for at least partially receiving another portion of the carton 105, as described further herein.

In one embodiment, the retention flap 138 can be formed by a line of weakening 140 in the top end flap 143 including one or more of straight, curved, and/or angled segments. In another embodiment, the retention flap 138 can be completely separable from the top end flap 143. In still another embodiment, a region of the blank corresponding to the retention flap 138 can be removed upon formation such that a retention opening 142 is presented.

As shown, one or more deboss regions 132, e.g., a raised or otherwise protruding regions in a direction away from the exterior side 101 of the blank 103, can be provided on one or more of the end flaps 135, 149, 141, 143. As described herein, the top end flaps 135, 139, 141, 143 can be at least partially overlapped to form a closed top end 115 of the carton 105.

As also shown, a dispenser end flap 144 can be foldably connected to the top end flap 135 at a lateral fold line 146, and can at least partially form the dispenser panel 111, as described further herein. In the illustrated embodiment, an access tab 148 can be foldably connected to the dispenser end flap 144 at a lateral fold line 150, and an embossed region 152, e.g., a pressed or otherwise protruding region in the direction of the exterior side 101 of the blank 103, can be provided on the dispenser end flap 144. As described herein, the dispenser end flap 144 and associated features can be dispenser features of the blank 103 for forming the dispenser 109 of the carton 105.

Similarly, a front bottom end flap 145 can be foldably connected to the front panel 121 at a respective portion of a longitudinal fold line 147, a first side bottom end flap 149 can be foldably connected to the first side panel 123 at a respective portion of the longitudinal fold line 147, a second side bottom end flap 151 can be foldably connected to the second side panel 127 at a respective portion of the longitudinal fold line 147, and a back bottom end flap 153 can be foldably connected to the back panel 131 at a respective portion of the longitudinal fold line 147. As shown, one or more deboss regions 132, e.g., a raised or otherwise protruding region in the direction of the exterior side 101 of the blank 103, can be provided on one or more of the end flaps 145, 149, 151, 153. The bottom end flaps 145, 149, 151, 153 can be at least partially overlapped to form a closed bottom end 117 of the carton 105.

As also shown, the dispenser features can also include a first reinforcement patch 155 separably connected to the first side panel 123 at an upper longitudinal line of weakening 157 that interrupts a portion of the fold line 137 and at a lower longitudinal line of weakening 159. A pair of curved, e.g., semicircular, cuts/openings 161, 163 can be positioned longitudinally adjacent a central portion of the first reinforcement patch 155. In one embodiment, the cuts/openings 161, 163 can be a curved region of the blank 103 separable from the first reinforcement patch 155 at one or more respective lines of weakening.

The dispenser features can also include a second reinforcement patch 165 separably connected to the attachment panel 134 at lateral line of weakening 167 and a lower longitudinal line of weakening 169. The lines of weakening 167, 169 can be connected, for example, by a curved cut or line of weakening. The second reinforcement patch 165, as shown, can include a lateral portion opposite the line of weakening 167 that extends past a free edge of the attachment panel 134. As described herein, one or more of the lines of weakening 157, 159 and/or cuts/openings 161, 163 associated with the first reinforcement patch 155 and/or one or more of the lines of weakening 167, 169 associated with the second reinforcement patch 165 can also be dispenser features for forming the dispenser 109 of the carton 105.

Figure 2:
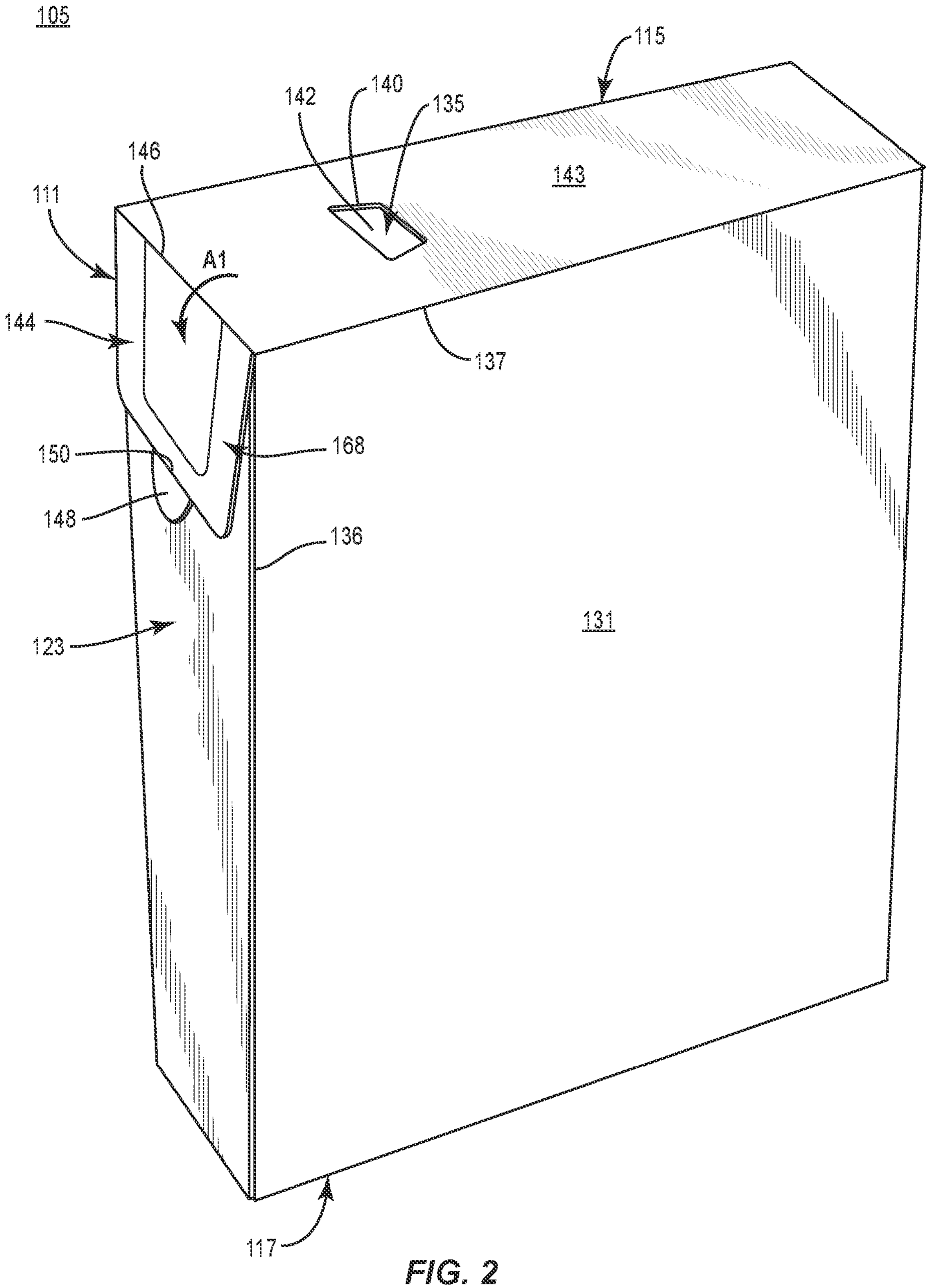
FIG. 2 is a perspective view of a carton formed from the blank of FIG. 1 in a closed configuration according to the exemplary embodiment of the disclosure.

Referring additionally to FIG. 2, the carton 105 is illustrated in a closed configuration. In one embodiment, the carton 105 can be formed by folding the plurality of panels to extend at least partially around the interior 107 of the carton 105, which can include folding the first side panel 123 at the fold line 125, folding the second side panel 127 at the fold line 129, and folding the back panel 131 at the fold line 133 such that the front panel 121 and the back panel 131 are in generally spaced apart and parallel relation, with each of the first side panel 123 and the second side panel 127 extending from the front panel 121 to the back panel 131 in generally spaced apart and parallel relation relative to one another. The attachment panel 134 can also be folded at the fold line 136 into at least partial face-to-face contact with the first side panel 123.

The top end flaps 139, 141 can be folded downwardly at respective portions of the fold line 137 toward the interior 107 of the carton 105, the top end flap 135 can be folded downwardly at a respective portion of the fold line 137 in at least partial face-to-face contact with respective portions of the end flaps 139, 141, and the top end flap 143 can be folded downwardly at a respective portion of the fold line 137 into at least partial face-to-face contact with the top end flap 135 to close the top end 115 of the carton 105.

Similarly, the bottom end flaps 149, 151 can be folded at respective portions of the fold line 147 toward the interior 107 of the carton 105, the bottom end flap 145 can be folded at a respective portion of the fold line 147 into at least partial face-to-face contact with respective portions of the bottom end flaps 149, 151, and the bottom end flap 153 can be folded at a respective portion of the fold line 147 into at least partial face-to-face contact with the bottom end flap 145 to close the bottom end 117 of the carton 105. The aforementioned arrangement of panels and flaps of the carton 105 can be maintained with one or more applications of an adhesive such as glue G (FIG. 1).

It will be understood that one or more articles, e.g., flowable food products, can be placed in the interior 107 of the carton 105 prior to closing the top end 115 or bottom end 117 of the carton 105. In this regard, in one embodiment, an interior surface of the blank 103/carton 105 can be treated, e.g., coated or otherwise configured, for direct or incidental contact with one or more food products. In one embodiment, the interior surface of the blank 103/carton 105 can be suitable for direct or incidental contact with one or more food products without the presence of any additional treatment. In such embodiments, the blank 103/carton 105 can be configured for contact with food products so as to obviate any liner, bag, or secondary packaging for food products in the carton 105.

In the aforementioned arrangement, the first reinforcement patch 155 can be generally longitudinally and laterally aligned with and positioned in at least partial face-to-face contact with the second reinforcement patch 165. The dispenser end flap 144 can be folded downwardly at the fold line 146 in the direction of the arrow A1 into at least partial face-to-face contact with the first reinforcement patch 155. Portions of the dispenser end flap 144 can also be in at least partial face-to-face contact with respective portions of the second reinforcement patch 165, e.g., at locations exposed by the cuts/openings 161, 163.

In this regard, the dispenser end flap 144, the first reinforcement patch 155, and the second reinforcement patch 165 together form the dispenser panel 111, with the dispenser end flap 144 attached to the first reinforcement patch 155 and the first reinforcement patch 155 attached to the second reinforcement patch 165. In one embodiment, the dispenser end flap 144 is attached to both the first reinforcement patch 155 and the second reinforcement patch 165. In one embodiment, the dispenser panel 111 can also include the access tab 148 foldably connected to the dispenser end flap 144.

The dispenser panel 111 is thus provided with a multi-ply, e.g., three-ply, arrangement owing to the overlapped dispenser end flap 144, first reinforcement patch 155, and second reinforcement patch 165. Accordingly, the dispenser panel 111 can be arranged with the first reinforcement patch 155 and the second reinforcement patch 165 forming a two-ply plug portion or protruding portion 166 (FIG. 3) of the dispenser panel 111 extending from a cover portion 168 formed by the dispenser end flap 144. In one embodiment, the first reinforcement patch 155 can be adhered to the dispenser end flap 144 by adhesive such as glue, and the second reinforcement patch 165 can be adhered to the first reinforcement patch 155 by adhesive such as glue to form the protruding portion 166. In this regard, free edges of the dispenser end flap 144 extend beyond respective free edges of the reinforcement patches 155, 165. Such a reinforced configuration of the dispenser panel 111 can provide a robust structure that can, for example, resist bending, bowing, buckling, and/or other deformation. Furthermore, the dispenser panel 111 is configured with a stable arrangement for engaging the remainder of the carton 105 to maintain one or more conditions of food products in the interior 107 of the carton 105.

Figure 3:
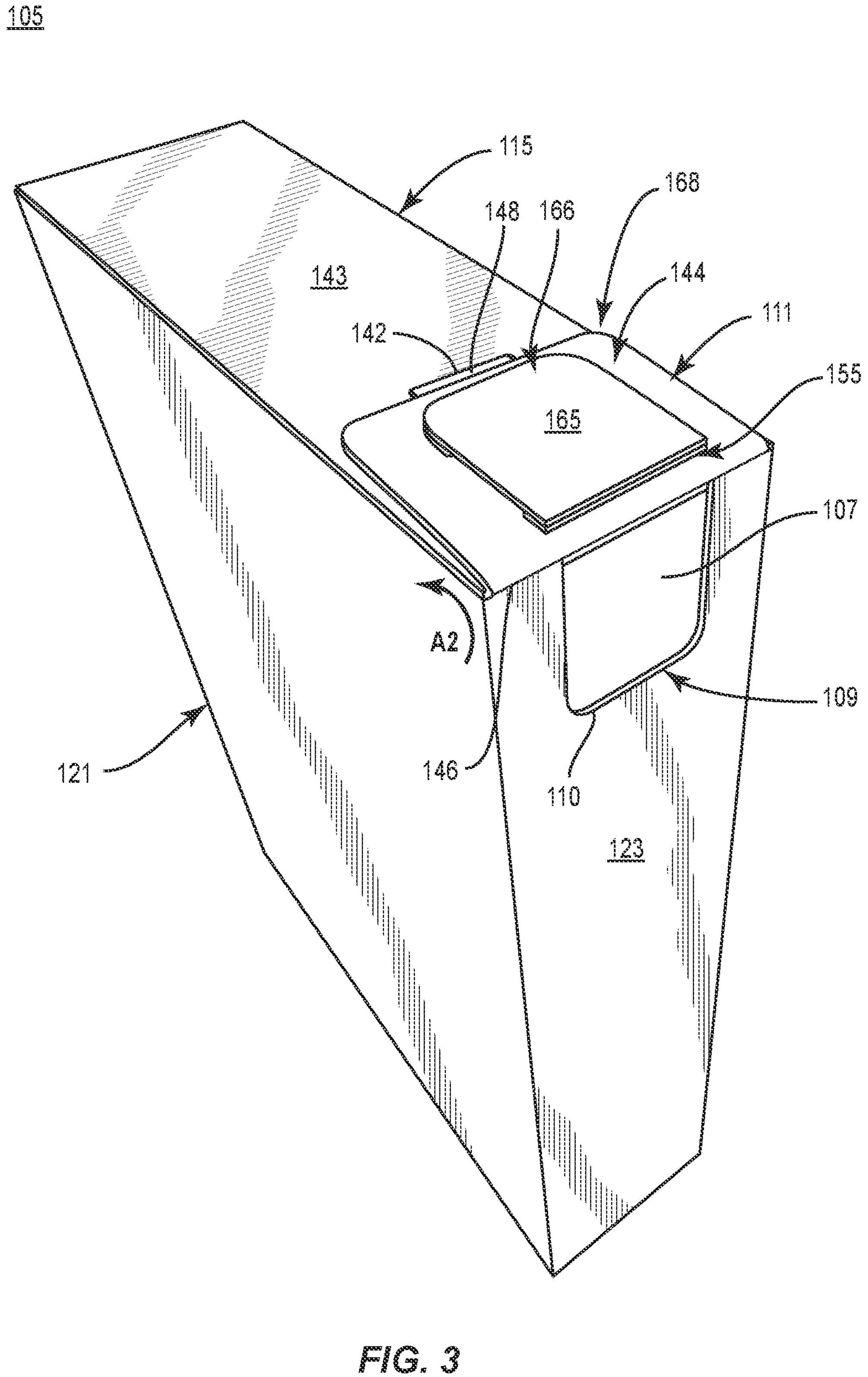
FIG. 3 is a perspective view of the carton of FIG. 2 in an open configuration.
Figure 4:
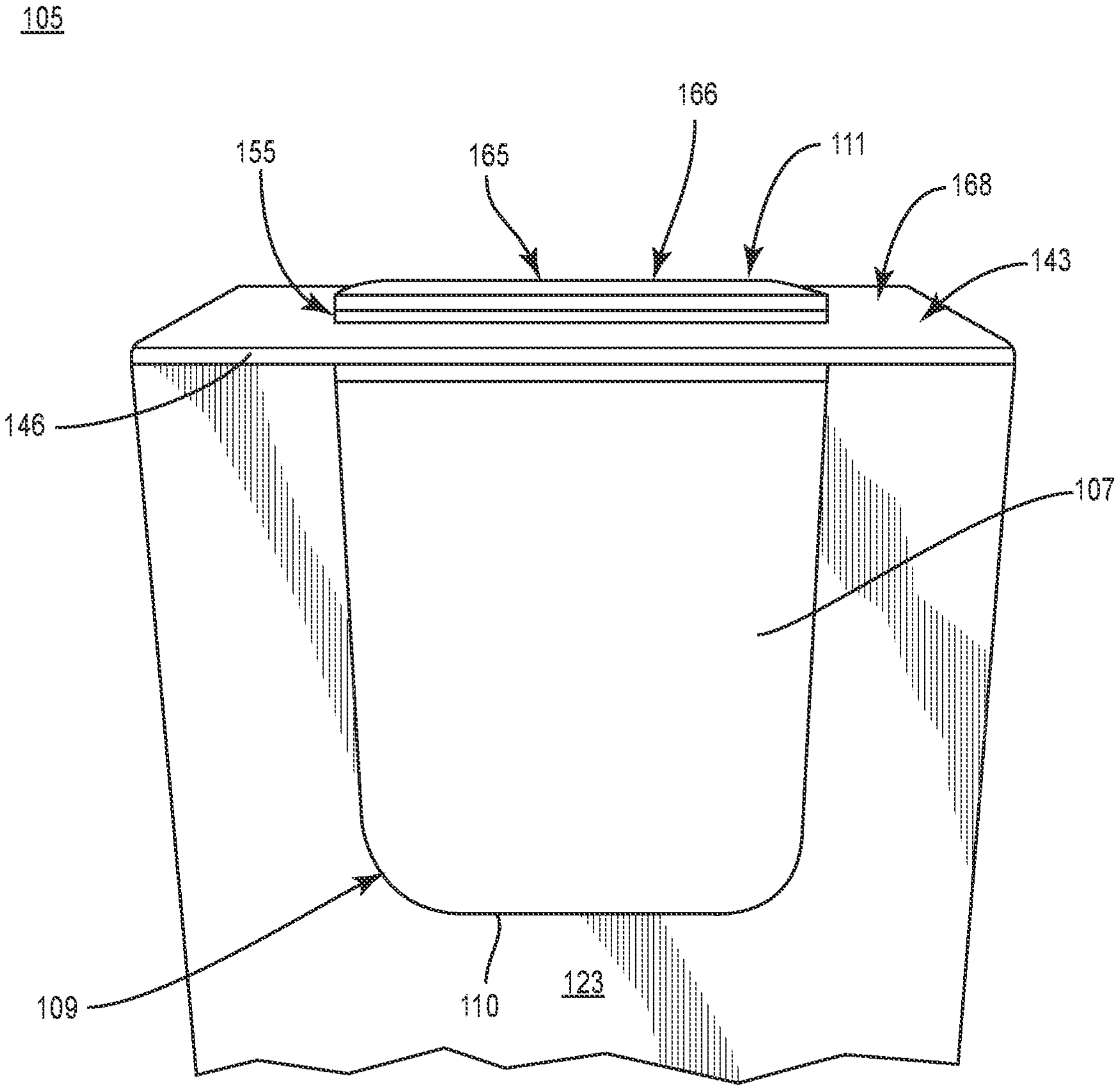
FIG. 4 is an enlarged perspective view of a portion of the carton of FIG. 2 in an open configuration.

With additional reference to FIGS. 3 and 4, in order to open/expose the dispenser 109 of the carton 105, a user can grasp the access tab 148 or otherwise engage the dispenser panel 111 and raise the dispenser end flap 144 upwardly at the fold line 146 in the direction of the arrow A2. Such movement of the dispenser end flap 144 causes the first reinforcement patch 155 and the second reinforcement patch 165 attached thereto to separate from the respective side panels 123, 134 at the respective lines of weakening 157, 159 and lines of weakening 167, 169 to expose aligned openings that provides a dispenser opening 110 at least partially formed in the side panel 123 to form the dispenser 109 and provide access to the interior 107 of the carton 105.

In this regard, the dispenser panel 111 can be selectively hingedly/pivotably moved toward and away from the dispenser 109 via folding at the fold line 146 between an open position and a closed position to transition between an open configuration of the carton 105/dispenser 109 (FIG. 3) and a closed configuration of the carton 105/dispenser 109 (FIG. 2).

In the course of such transition of the dispenser panel 111 between the open position and the closed position, a user can move/pivot the dispenser panel 111 by engaging the access tab 148. In order to maintain the dispenser panel 111 in the open position, the user can at least partially separate the retention flap 138 from the top end flap 143, e.g., at the line of weakening 140, and insert the access tab 148 at least partially through a retention opening 142 in the top end flap 143 of the carton 105 exposed thereby, e.g., so that the access tab 148 is at least partially inserted between the top end flap 143 and the top end flap 135 to maintain the dispenser panel 111 in the open position. It will be understood that the retention flap 138 can be separated from the top end flap 143 during the formation of the carton 105 as described above. Alternatively, the blank 103 can be provided with the retention flap 138 removed and the retention opening 142 exposed, prior to forming the carton 105 from the blank.

When the dispenser panel 111 is in the open position, the dispenser panel 111 is spaced away from and exposes the dispenser 109/dispenser opening 110 such that products in the interior 107 of the carton 105 can be accessed. In one embodiment, a user can tilt or at least partially invert the carton 105 to cause one or more products, e.g., flowable products to exit the interior 107 of the carton 105 through the dispenser 109 under the influence of gravity. It will be understood that the dispenser 109 can be provided with one or more features to facilitate such flow of flowable products through the dispenser 109, e.g., a spout, chute, etc.

Figure 5:
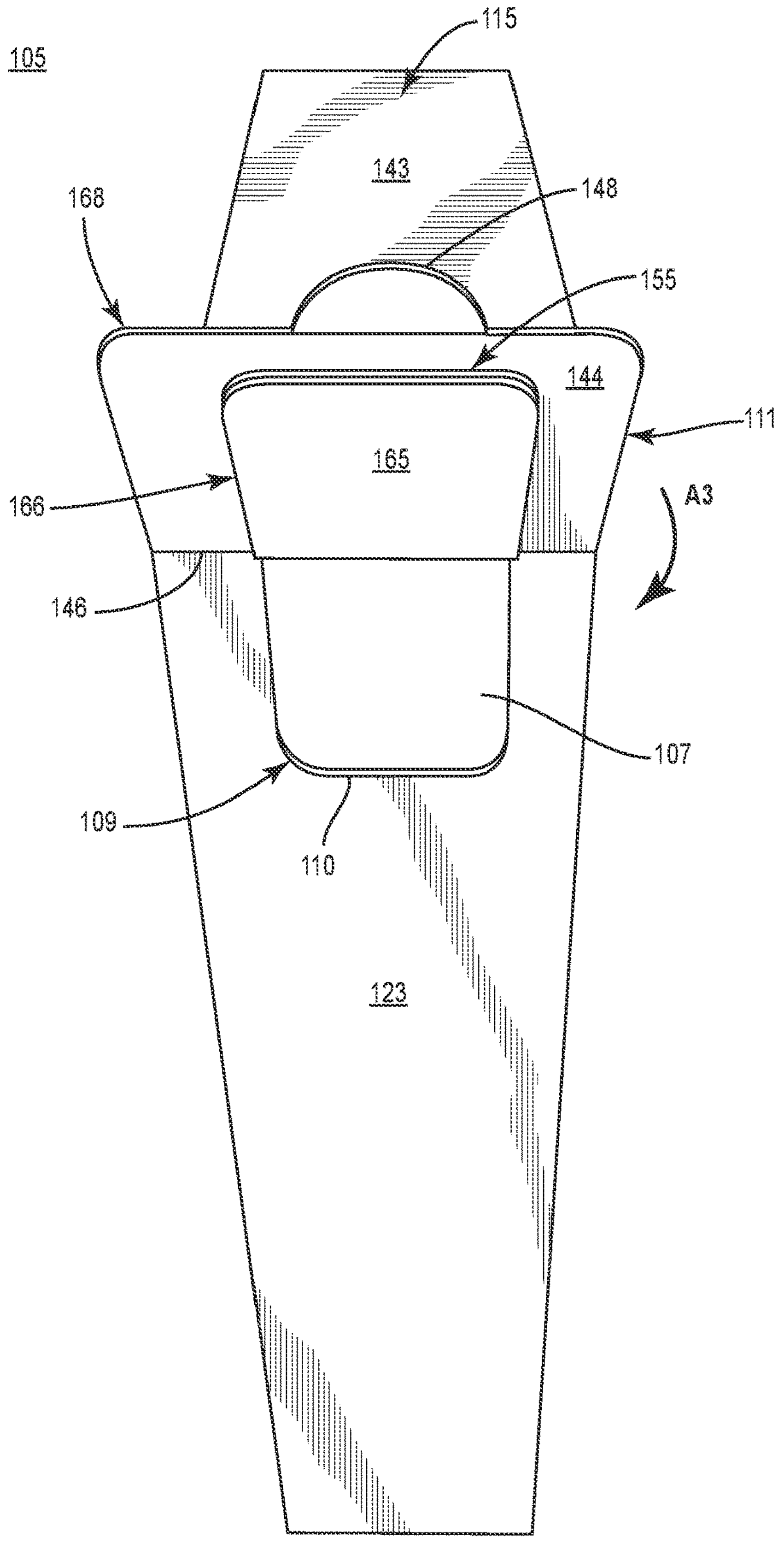
FIG. 5 is a perspective view of the carton of FIG. 2 in transition from a closed configuration to an open configuration.

In order to close the carton 105/dispenser 109, as shown in FIG. 5, a user can grasp the tab 148 or otherwise engage the dispenser panel 111 and fold the dispenser end flap 144 downwardly at the fold line 146 in the direction of the arrow A3 to move the dispenser panel 111 to the closed position. In the closed position of the dispenser panel 111, the protruding portion 166 including the first reinforcement patch 155 and the second reinforcement patch 165 can protrude from the dispenser end flap 144 and one or both of the reinforcement patches 155, 165 can be at least partially inserted through the dispenser 109/dispenser opening 110 into the interior 107 of the carton 105, with the dispenser end flap 144 overlying/occluding the dispenser 109 and at least partially overlying and/or in at least partial face-to-face contact with the first side panel 123. In one embodiment, in the closed position of the dispenser 109, the protruding portion 166 can be in close through the dispenser opening 110 and be in contact with the edges of the dispenser opening to at least partially seal against the removal of flowable product through the dispenser opening. Further, in the closed position of the dispenser 109, the dispenser panel 111 can at least partially cover the edges of the dispenser opening 110 to at least partially seal against the removal of flowable product through the dispenser opening.

Upon at least partial insertion of the dispenser panel 111 through the dispenser 109 as described above, one or more portions of the first reinforcement patch 155 and/or the second reinforcement patch 165 can engage one or more portions of the carton 105, e.g., edges of the respective panels 123, 134 to position/maintain the dispenser end flap 144 overlying/occluding the dispenser opening 110. In this regard, the dispenser panel 111 can form closure features for the carton 105.

In view of the foregoing, the dispenser panel 111 can cooperate with the carton 105 to selectively close the interior 107 of the carton 105, for example, to seal and maintain one or more properties of the products in the interior 107 of the carton 105, e.g., freshness, taste, texture, moisture content, etc., and/or to inhibit, minimize, and/or prevent one or more properties of products in the interior 107 of the carton 105, e.g., staleness, loss of taste, etc. It will be understood that the dispenser panel 111 can seal the carton 105 in the closed position to minimize, inhibit, and/or prevent the passage of one or more materials into the interior 107 of the carton 105, for example, condensation or other moisture, insects or other pests, dirt, debris, etc. In one embodiment, the dispenser panel 111 can at least partially form/maintain a hermetic seal around the interior 107 of the carton 105.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the cartons, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term "glue" is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton for holding and dispensing a flowable product, the carton comprising:

a plurality of panels extending at least partially around an interior of the carton and including a front panel, a back panel, and at least one side panel;

a plurality of end flaps foldably connected to respective panels of the plurality of panels for forming at least one closed end of the carton, the plurality of end flaps comprising at least one top end flap foldably connected to a respective panel of the plurality of panels and a dispenser end flap foldably connected to the at least one top end flap; and a dispenser for accessing the interior of the carton, the dispenser comprising a dispenser panel and a dispenser opening, the dispenser panel being movable between a closed position wherein the dispenser opening is closed and an open position wherein the dispenser opening is open to allow removal of the flowable product through the dispenser opening, the dispenser panel comprises a cover portion and a protruding portion extending from the cover portion, the cover portion comprising the dispenser end flap;

wherein in the closed position, the protruding portion is at least partially received in the dispenser opening; and wherein the protruding portion of the dispenser panel has a two-ply configuration.

2. The carton of claim 1, wherein, in the open position, the protruding portion of the dispenser panel is at least partially spaced away from the dispenser opening.

3. The carton of claim 2, wherein the dispenser opening is formed in the at least one side panel.

4. The carton of claim 3, wherein the dispenser panel is foldably connected to the at least one top end flap.

5. The carton of claim 4, wherein the dispenser panel further comprises at least one reinforcement patch attached to the dispenser end flap.

6. The carton of claim 4, wherein the dispenser panel further comprises an access tab foldably connected to the dispenser end flap.

7. The carton of claim 6, wherein the at least one top end flap comprises a retention opening for at least partially receiving the access tab for maintaining the dispenser panel in the open position.

8. The carton of claim 5, wherein the at least one reinforcement patch is a first reinforcement patch attached to the dispenser end flap, and the dispenser panel further comprises a second reinforcement patch attached to the first reinforcement patch.

9. The carton of claim 8, wherein the dispenser end flap forms the cover portion of the dispenser panel, and the first reinforcement patch and the second reinforcement patch form the protruding portion of the dispenser panel.

10. The carton of claim 9, wherein free edges of the dispenser end flap extend beyond respective free edges of each of the first reinforcement patch and the second reinforcement patch.

11. The carton of claim 10, wherein the at least one side panel is a first side panel and the plurality of panels further comprises a second side panel.

12. The carton of claim 11, wherein the plurality of end flaps comprises a plurality of top end flaps that includes the at least one top end flap, the at least one closed end of the carton is a top closed end of the carton, the plurality of top end flaps arranged to form the top closed end of the carton, and the plurality of end flaps further comprises a plurality of bottom end flaps arranged to form a bottom closed end of the carton.

13. A blank for forming a carton for holding and dispensing a flowable product, the blank comprising:

a plurality of panels for extending at least partially around an interior of the carton when the carton is formed from the blank, the plurality of panels comprising a front panel, a back panel, and at least one side panel;

a plurality of end flaps foldably connected to respective panels of the plurality of panels for forming at least one closed end of the carton when the carton is formed from the blank, the plurality of end flaps comprising at least one top end flap foldably connected to a respective panel of the plurality of panels and a dispenser end flap foldably connected to the at least one top end flap;

dispenser features for forming a dispenser for accessing the interior of the carton formed from the blank, the dispenser features for forming a dispenser panel and a dispenser opening in the carton formed from the blank such that the dispenser panel is movable between a closed position wherein the dispenser opening is closed and an open position wherein the dispenser opening is open to allow removal of the flowable product through the dispenser opening when the carton is formed from the blank, the dispenser features are for forming the dispenser panel having a cover portion and a protruding portion extending from the cover portion, the cover portion comprising the dispenser end flap;

wherein in the closed position, the protruding portion is at least partially received in the dispenser opening when the carton is formed from the blank; and wherein the protruding portion of the dispenser panel has a two-ply configuration.

14. The blank of claim 13, wherein the dispenser opening is for being formed in the at least one side panel when the carton is formed from the blank.

15. The blank of claim 14, wherein the dispenser panel is for being foldably connected to the at least one top end flap when the carton is formed from the blank.

16. The blank of claim 15, wherein the dispenser features further comprise at least one reinforcement patch separably attached to the remainder of the blank for being attached to the dispenser end flap when the carton is formed from the blank.

17. The blank of claim 15, wherein the dispenser features further comprise an access tab foldably connected to the dispenser end flap.

18. The blank of claim 17, the at least one top end flap comprises a retention opening for at least partially receiving the access tab for maintaining the dispenser panel in the open position when the carton is formed from the blank.

19. The blank of claim 16, wherein the at least one reinforcement patch is a first reinforcement patch, and the dispenser panel further comprises a second reinforcement patch separably attached to the remainder of the blank and for being attached to the first reinforcement patch when the carton is formed from the blank.

20. The blank of claim 19, wherein the at least one side panel is a first side panel and the plurality of panels further comprises a second side panel.

21. The blank of claim 20, wherein the plurality of end flaps comprises a plurality of top end flaps that includes the at least one top end flap, the plurality of top end flaps arranged to form the closed end of the carton formed from the blank, the closed end for being a top closed end of the carton formed from the blank, and the plurality of end flaps further comprises a plurality of bottom end flaps for being arranged to form a bottom closed end of the carton formed from the blank.

22. A method of forming a carton for holding and dispensing a flowable product, the method comprising:

obtaining a blank comprising a plurality of panels including a front panel, a back panel, and at least one side panel, a plurality of end flaps foldably connected to respective panels of the plurality of panels, the plurality of end flaps comprising at least one top end flap foldably connected to a respective panel of the plurality of panels and a dispenser end flap foldably connected to the at least one top end flap, and dispenser features;

folding the plurality of panels at least partially around an interior of the carton;

folding the plurality of end flaps to form at least one closed end of the carton;

arranging the dispenser features to form a dispenser comprising a dispenser panel and a dispenser opening, the dispenser panel comprising a cover portion and a protruding portion extending from the cover portion, the cover portion comprising the dispenser end flap; and positioning the dispenser panel in a closed position in which the protruding portion is at least partially received in the dispenser opening;

wherein the arranging the dispenser features comprises arranging the protruding portion of the dispenser panel with a two-ply configuration.

23. The method of claim 22, further comprising positioning the dispenser panel in an open position in which the dispenser opening is open to allow removal of the flowable product through the dispenser opening.

24. The method of claim 23, wherein positioning the dispenser panel in the open position comprises positioning the protruding portion of the dispenser panel at least partially spaced away from the dispenser opening.

25. The method of claim 24, wherein the dispenser opening is formed in the at least one side panel.

26. The method of claim 25, wherein the dispenser panel is foldably connected to the at least one top end flap.

27. The method of claim 26, wherein the dispenser features further comprise at least one reinforcement patch separably connected to the remainder of the blank, and the arranging the dispenser features comprises attaching the at least one reinforcement patch to the dispenser end flap.

28. The method of claim 26, wherein the dispenser features further comprise an access tab foldably connected to the dispenser end flap.

29. The method of claim 28, wherein the at least one top end flap comprises a retention opening for at least partially receiving the access tab for maintaining the dispenser panel in the open position.

30. The method of claim 29, wherein the positioning the dispenser panel in the open position comprises at least partially inserting the access tab into the retention opening.

31. The method of claim 27, wherein the at least one reinforcement patch is a first reinforcement patch, the dispenser features further comprise a second reinforcement patch separably connected to the remainder of the blank, and the arranging the dispenser features further comprises attaching the second reinforcement patch to the first reinforcement patch.

32. The method of claim 31, wherein the dispenser end flap forms the cover portion of the dispenser panel, and the first reinforcement patch and the second reinforcement patch form the protruding portion of the dispenser panel.

33. The method of claim 32, wherein free edges of the dispenser end flap extend beyond respective free edges of each of the first reinforcement patch and the second reinforcement patch.

34. The method of claim 33, wherein the at least one side panel is a first side panel and the plurality of panels further comprises a second side panel.

35. The method of claim 34, wherein the plurality of end flaps comprises a plurality of top end flaps that includes the at least one top end flap, the at least one closed end of the carton is a top closed end of the carton, the plurality of top end flaps is folded to form the top closed end of the carton, the plurality of end flaps further comprises a plurality of bottom end flaps, and the method further comprises folding the plurality of bottom end flaps to form a bottom closed end of the carton.

36. A carton for holding and dispensing a flowable product, the carton comprising:

a plurality of panels extending at least partially around an interior of the carton and including a front panel, a back panel, and at least one side panel;

a plurality of end flaps foldably connected to respective panels of the plurality of panels for forming at least one closed end of the carton, the plurality of end flaps comprising at least one top end flap foldably connected to a respective panel of the plurality of panels and a dispenser end flap foldably connected to the at least one top end flap; and a dispenser for accessing the interior of the carton, the dispenser comprising a dispenser panel foldably connected to the at least one top end flap and a dispenser opening formed in the at least one side panel, the dispenser panel being movable between a closed position wherein the dispenser opening is closed and an open position wherein the dispenser opening is open to allow removal of the flowable product through the dispenser opening, the dispenser panel comprising a cover portion comprising the dispenser end flap, a protruding portion extending from the cover portion, and an access tab foldably connected to the dispenser end flap;

wherein in the closed position, the protruding portion is at least partially received in the dispenser opening, and in the open position, the protruding portion of the dispenser panel is at least partially spaced away from the dispenser opening; and wherein the at least one top end flap comprises a retention opening for at least partially receiving the access tab for maintaining the dispenser panel in the open position.

37. A blank for forming a carton for holding and dispensing a flowable product, the blank comprising:

a plurality of panels for extending at least partially around an interior of the carton when the carton is formed from the blank, the plurality of panels comprising a front panel, a back panel, and at least one side panel;

a plurality of end flaps foldably connected to respective panels of the plurality of panels for forming at least one closed end of the carton when the carton is formed from the blank, the plurality of end flaps comprising at least one top end flap foldably connected to a respective panel of the plurality of panels and a dispenser end flap foldably connected to the at least one top end flap;

dispenser features for forming a dispenser for accessing the interior of the carton formed from the blank, the dispenser features comprising a dispenser panel foldably connected to the at least one top end flap, a dispenser opening formed in the at least one side panel, and an access tab foldably connected to the dispenser end flap when the carton is formed from the blank;

the dispenser panel is movable between a closed position wherein the dispenser opening is closed, and an open position wherein the dispenser opening is open to allow removal of the flowable product through the dispenser opening when the carton is formed from the blank, the dispenser features are for forming the dispenser panel having a cover portion and a protruding portion extending from the cover portion, the cover portion comprising the dispenser end flap in the closed position, the protruding portion is at least partially received in the dispenser opening when the carton is formed from the blank;

wherein the at least one top end flap comprises a retention opening for at least partially receiving the access tab for maintaining the dispenser panel in the open position when the carton is formed from the blank.

38. A method of forming a carton for holding and dispensing a flowable product, the method comprising:

obtaining a blank comprising a plurality of panels including a front panel, a back panel, and at least one side panel, a plurality of end flaps foldably connected to respective panels of the plurality of panels, the plurality of end flaps comprising at least one top end flap foldably connected to a respective panel of the plurality of panels and a dispenser end flap foldably connected to the at least one top end flap, and dispenser features;

folding the plurality of panels at least partially around an interior of the carton;

folding the plurality of end flaps to form at least one closed end of the carton;

arranging the dispenser features to form a dispenser comprising a dispenser panel foldably connected to the at least one top end flap, a dispenser opening formed in the at least one side panel, and an access tab foldably connected to the dispenser end flap, the dispenser panel comprising a cover portion and a protruding portion extending from the cover portion, the cover portion comprising the dispenser end flap;

positioning the dispenser panel in a closed position in which the protruding portion is at least partially received in the dispenser opening; and positioning the dispenser panel in an open position in which the dispenser opening is open to allow removal of the flowable product through the dispenser opening, wherein positioning the dispenser panel in the open position comprises positioning the protruding portion of the dispenser panel at least partially spaced away from the dispenser opening;

wherein the at least one top end flap comprises a retention opening for at least partially receiving the access tab for maintaining the dispenser panel in the open position.

39. The carton of claim 1, wherein the cover portion and the protruding portion together form a three-ply configuration.

40. The blank of claim 13, wherein the cover portion and the protruding portion together form a three-ply configuration.

41. The method of claim 22, wherein the cover portion and the protruding portion together form a three-ply configuration.

* * * * *